United States Patent
Xiang et al.

(10) Patent No.: US 9,806,896 B2
(45) Date of Patent: Oct. 31, 2017

(54) OPTIMIZED MESSAGE RETRANSMISSION MECHANISM FOR DISTRIBUTED STORAGE VIRTUALIZATION DIRECTORY SYSTEM

(71) Applicant: Nicira, Inc., Palo Alto, CA (US)

(72) Inventors: Enning Xiang, Beijing (CN); Jorge Guerra Delgado, Sunnyvale, CA (US)

(73) Assignee: NICIRA, INC., Palo Alto, CA (US)

( * ) Notice: Subject to any disclaimer, the term of this patent is extended or adjusted under 35 U.S.C. 154(b) by 203 days.

(21) Appl. No.: 14/558,528

(22) Filed: Dec. 2, 2014

(65) Prior Publication Data

US 2016/0094356 A1    Mar. 31, 2016

Related U.S. Application Data

(60) Provisional application No. 62/057,941, filed on Sep. 30, 2014.

(51) Int. Cl.
| | |
|---|---|
| *H04L 12/18* | (2006.01) |
| *H04L 1/16* | (2006.01) |
| *H04L 29/08* | (2006.01) |
| *H04L 12/939* | (2013.01) |

(Continued)

(52) U.S. Cl.
CPC ......... *H04L 12/1886* (2013.01); *H04L 1/165* (2013.01); *H04L 1/1685* (2013.01); *H04L 12/1881* (2013.01); *H04L 67/1095* (2013.01); *G06F 2009/45595* (2013.01); *H04L 49/552* (2013.01); *H04L 67/1097* (2013.01); *H04L 2001/0093* (2013.01)

(58) Field of Classification Search
CPC . H04L 2001/0093; H04L 45/16; H04L 45/02; H04L 65/4076; H04L 49/201; H04L 49/356; H04N 21/6405; H04N 21/6408; G06F 3/067; G06F 15/17331
See application file for complete search history.

(56) References Cited

U.S. PATENT DOCUMENTS 5,825,772 A * 10/1998 Dobbins ............. H04L 12/1886
                                                           370/396
6,721,320 B1 * 4/2004 Hoglund ............... H04L 49/357
                                                           370/392

(Continued)

*Primary Examiner* — Marsha D. Banks Harold
*Assistant Examiner* — Elton Williams
(74) *Attorney, Agent, or Firm* — Adeli LLP

(57) ABSTRACT

A method of retransmitting a multicast message through a unicast channel in a virtual distributed storage system comprising a cluster of nodes that includes a master node and a set of agent nodes is provided. Each node maintains a copy of a directory of the virtual distributed storage system. The master node multicasts messages to the agent node through a multicast channel to update the directory. The method determines that a particular message to update the directory exceeds a maximum size limit for transmit to the agent nodes through the multicast channel. The method multicasts a retransmission trigger message from the master node to each agent node. The method receives a retransmission request message at the master node from each of the agent nodes through a unicast channel. The method sends the particular message to update the directory from the master node to each agent node through the unicast channel.

16 Claims, 9 Drawing Sheets

(51) Int. Cl.
*G06F 9/455* (2006.01)
*H04L 1/00* (2006.01)

(56) References Cited

U.S. PATENT DOCUMENTS

| | | | |
|---|---|---|---|
| 7,752,403 B1 * | 7/2010 | Weinman, Jr. | G06F 21/6227 711/161 |
| 2006/0133376 A1 * | 6/2006 | Valdevit | H04L 41/024 370/390 |
| 2014/0130055 A1 * | 5/2014 | Guha | G06F 3/0604 718/104 |

* cited by examiner

OPTIMIZED MESSAGE RETRANSMISSION MECHANISM FOR DISTRIBUTED STORAGE VIRTUALIZATION DIRECTORY SYSTEM

This application claims the benefit of U.S. Provisional Patent Application 62/057,941, filed Sep. 30, 2014. U.S. Application 62/057,941 is incorporated herein by reference.

BACKGROUND

A cloud distributed storage system (or virtualized distributed storage system) is a virtual storage network that interconnects hosts and storage devices. A group of hosts create a cluster of hosts. Each host in the cluster is referred to as a cluster node. Each host includes a directory service that maintains an updated directory of the distributed storage objects that reside on each host in a cluster. The directory is a key-value store. A node elected as master maintains a master copy of the directory.

The master node receives messages from each agent node informing the master node of updates to the local objects owned by the agent node. The master node also receives messages from agent nodes requesting current values of objects in the directory. In cloud distributed storage systems, messages may fail to be delivered to recipients due to application constraints such as the size of the message or network infrastructure issues. To address this problem, retransmission is used to guarantee the eventual success of message delivery to target hosts.

BRIEF SUMMARY

Some embodiments provide an enhanced message retransmission approach for cloud distributed storage systems, which triggers message retransmission immediately after a multicast message is not delivered due to application constraints such as multicast message size limit exceeding a threshold. The low latency of this approach provides latency improvement for the upper layer distributed storage virtualization I/O flow against prior art retransmission approaches.

A cloud distributed storage system includes a master node and several agent nodes that form a cluster of nodes. The nodes are physical computing devices that host one or more virtual machines (VMs). A distributed data store is created from the local storage resources of the hosts in cluster. All hosts within the cluster can contribute to the data store, which is in turn shared by all cluster nodes. The master node maintains a master copy of the directory of the storage objects. The master node receives updates to the storage objects from the agent nodes that own these objects. The master node updates the master copy of the cluster directory and also sends updates through a multicast channel to agent nodes to update the local copies of the cluster directories.

The master node determines the size of multicast messages that are sent to agent node update the local copies of the cluster directory. The size of multicast messages has a maximum limit. When the size of an update message exceeds the maximum size threshold for multicast packets, the master does not transmit the multicast message.

Instead, the master node multicasts a retransmission trigger message to the agent nodes. The agent nodes send retransmission requests to the master node by using a unicast channel. The agent nodes send the retransmission requests immediately without any timeouts or without waiting for a subsequent update message or a heartbeat message in order to determine that an update message has not been sent by the master node. The master node then retransmits the cluster directory update message to each agent node via a unicast channel between the master node and each agent node.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing.

BRIEF DESCRIPTION OF THE DRAWINGS

The novel features of the invention are set forth in the appended claims. However, for purposes of explanation, several embodiments of the invention are set forth in the following figures.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

I. Directory Service for Cloud Distributed Storage Systems

Figure 1:
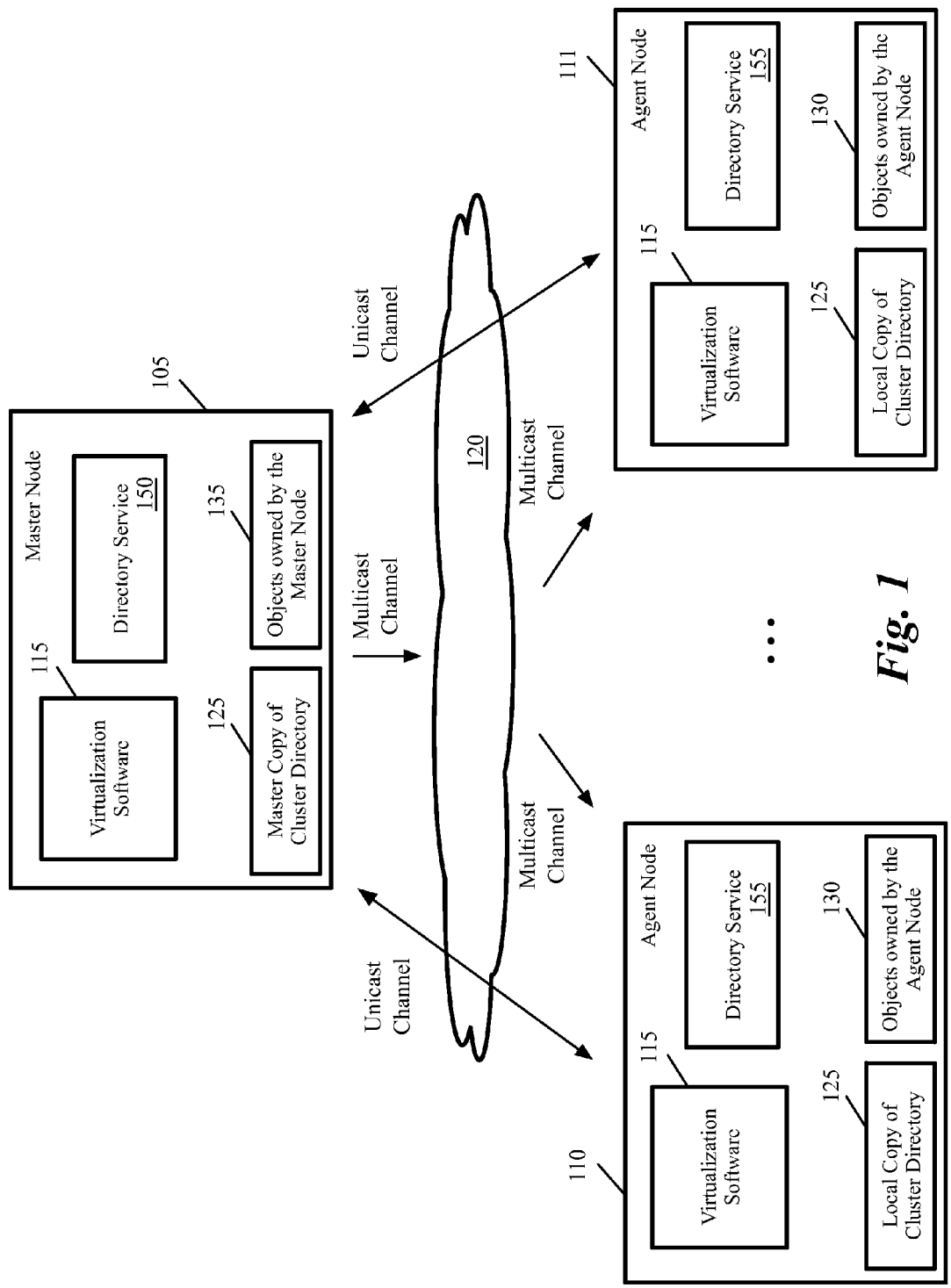
FIG. 1 conceptually illustrates a cloud distributed storage system in some embodiments of the invention.

FIG. 1 conceptually illustrates a cloud distributed storage system in some embodiments of the invention. An example of such a system is virtual storage area network (VSAN). As shown, the system includes a master node 105 and several agent nodes 110-111. The master node and the agent nodes form a cluster of nodes. The nodes are physical computing devices that host one or more virtual machines (VMs). The VMs are not shown in the figure for simplicity.

The master node and the agent nodes communicate through a network 120 using multicast and unicast channels. In some embodiments, the network provides Open Systems Interconnection (OSI) model Layer 2 (L2) connectivity between the master and agent nodes.

Each host includes virtualization software 115 (also referred to as hypervisor) and directory service 150-155. Each node may own one or more storage objects 130-135. In addition, different components of a storage object may be owned by different nodes.

In some embodiments, a distributed data store is created from the local storage resources of the hosts in a cluster. All hosts within the cluster can contribute to the data store, which is in turn shared by all cluster nodes. In some embodiments, the storage objects owned by each host include virtual disks, delta-disks (which are snapshots of VMs' storage), swap objects used to power on VMs, and VM files. VM files include VMs' configuration files, log files, contents of VM's hard disk drive, and any other storage objects in a VM home directory. In some embodiments, storage objects are defined as a "redundant array of independent disks" (RAID) tree, where each leaf of the tree is a component of the storage object. RAID combines multiple disk drives such as solid state drives (SSDs) or hard disk drives (HDDs) into a logical unit.

The master node 105 maintains a master copy 125 of the directory of the storage objects. A directory is a key-value store that maps each key to a corresponding value. The directory service 150 of the master node receives updates to the storage objects from the directory service 155 of the agent nodes that update the objects. The master node updates the master copy of the cluster directory 125 and also sends updates to agent nodes to update the local copies 125 of the cluster directories.

The directory service of each node maintains an updated directory of the distributed storage objects that reside on each node in a cluster of hosts, participates in an election for a new master node, being the master node if elected, publishes the cluster directory to local services, accepts subscriptions to the cluster directory from other local modules (i.e., modules that need to be informed of changes to the values of objects they subscribe to), and checking heartbeats from other nodes. The directory service applies updates in the same order on all nodes. A given node, however, may be a number of updates ahead of another node for a brief time, if the second node happens to have missed some updates and has to ask for them to be retransmitted.

The master node uses a multicast channel to send heartbeat messages and cluster directory updates message to the agent nodes. The master node and agent nodes communicate through a unicast channel to transmit other messages. Multicast is used to communicate information to a set of other points. Unicast is used to communicate information from one node to another. Broadcast is used to communicate information from one point to all other points. Unicast, broadcast, and multicast packets are distinguished by the use of special class of destination addresses, which denotes a specific multicast group.

In some embodiments each update message sent from master has a sequence number that increases for each consecutive update message. For instance, if the sequence number of an update message is N, the sequence number of the next update message is N+1 (N+p, where p is any constant value). On the other hand, the multicast heartbeat messages do not have their own sequence numbers. Instead, multicast heartbeat messages include the sequence number of the next upcoming multicast message. For instance, when an update message with sequence number N is already sent by the master, every heartbeat message after this update message and before the next update message includes N+1 as the sequence number of the next update message.

Based on this mechanism, the agent nodes have several mechanisms to determine whether an update message has not arrived. An agent can examine heartbeat messages to determine whether an update message has not arrived. For instance, when the agent node has already received an update with sequence number N and the agent node receives a heartbeat that identifies the sequence number of the next update message as N+2, the agent determines that the update message with sequence number N+1 has not been received. Similarly, an agent can compare the sequence number of a received update with the sequence number of the last received update. If the numbers are not sequential, the agent determines that one or more update messages have not been received.

Unlike broadcast transmission, multicast clients receive multicast packets only if the clients have elected to receive them (e.g., by joining a specific multicast group address). In some embodiments, agent nodes that require receiving updates to certain storage objects or components of objects subscribe (e.g., by providing the master with the key of the directory entry to subscribe) to receive multicast update messages from the master node. The master node sends an update (or callback) message to the subscribed agent nodes when a storage object or component subscribed by one or more agent nodes is updated.

Figure 2:
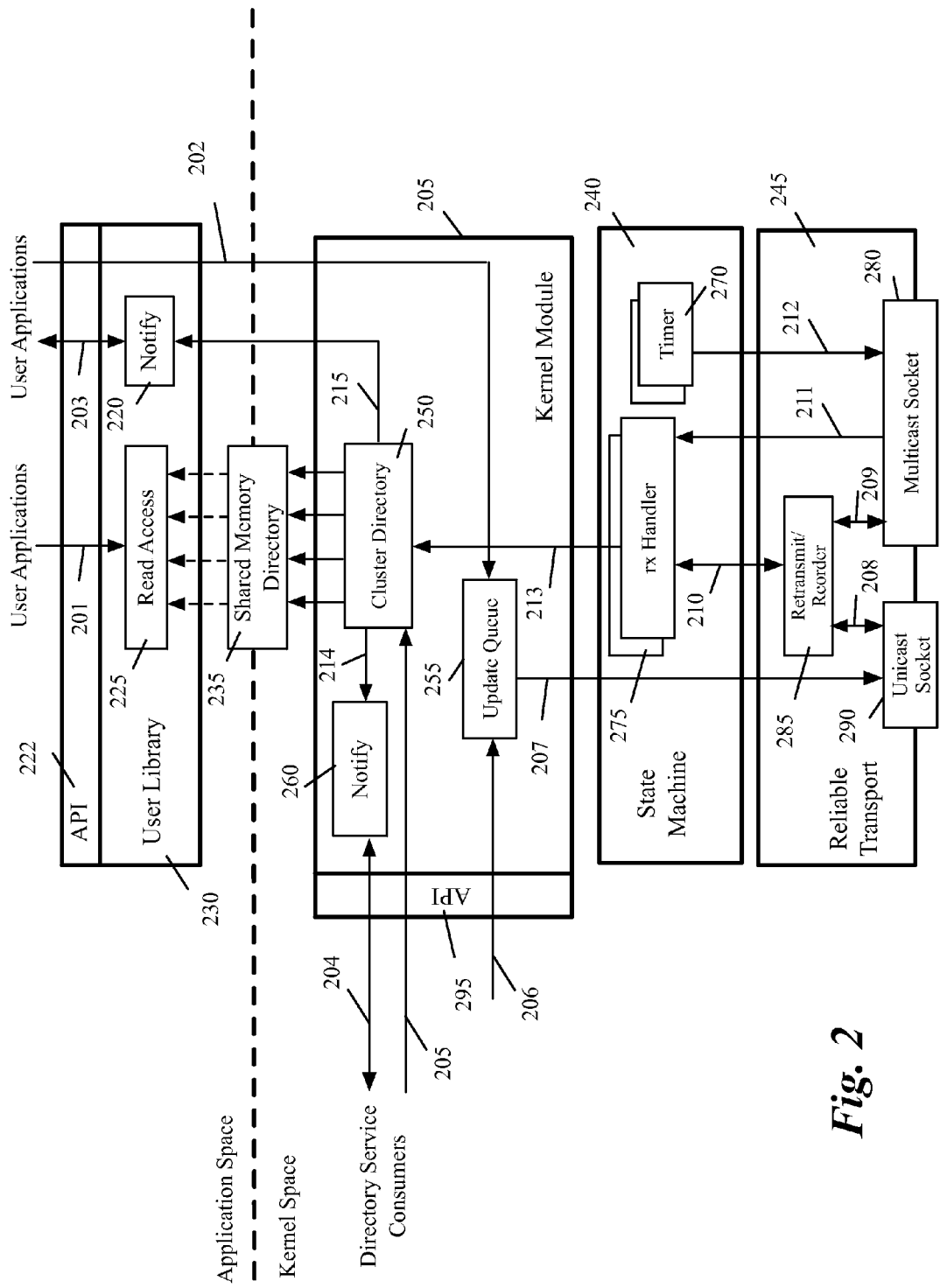
FIG. 2 conceptually illustrates directory service of a host in some embodiments of the invention.

FIG. 2 conceptually illustrates directory service of a host in some embodiments of the invention. The host can be either a master node or an agent node. As shown, the directory service provides two application programming interfaces (APIs) 222 and 295. API 222 is utilized by applications running on the host to access directory services. API 295 is utilized by system software modules to access directory services included in kernel module 205. The APIs provide the functionality to update the directory by adding or removing entries, query the directory, and subscribe to changes in the directory.

The directory service stores a local copy 250 of the cluster directory at the host. If the host that is running the directory service is elected as the master node of the cluster, the local copy 250 of the cluster directory is also the master copy of the cluster directory. The directory service provides a shared memory directory 235, which is a copy of the cluster directory kept in memory.

Applications running on the host have (as shown by arrow labeled 201) read access to shared memory directory 235. The applications use API 222 to gain read access 225 through the user library 230 to the shared memory directory 235. Write access is provided for user applications by writing (as shown by 202) the updates to an update queue 255. If the node is an agent node, the updates are subsequently forwarded (as shown by 207) from the update queue 255 to the master node by sending unicast messages through the unicast socket 290 provided by the reliable transport 245. In case the host is the master node, the update is handled locally.

The reliable transport, in some embodiments, is provided by using reliable datagram transport (RDT) communication mechanism. RDT uses transmission control protocol (TCP) at the transport layer (e.g., at OSI Layer 4 (L4) or at the transport layer of TCP/IP protocol) to provide end-to-end or host-to-host communication services for applications. Subscription registration and callbacks are provided (as shown by 203 and 215) through API 222 and notify module 220 to let application know of changes to the subscribed storage objects.

In kernel space, subscription and callbacks are provided (as shown by 204) for kernel space directory service consumers through API 295 and notify module 260. The read access in kernel space is provided (as shown by 205) through API 295 to the cluster directory) 250, which is a part of the kernel module 205. Kernel level write access is provided (as shown by 206) to the update queue 255. Similar to the write access for application level consumers, the updates for agent nodes are subsequently forwarded (as shown by 207) from the update queue 255 to the master node by sending unicast messages through the unicast socket 290 provided by the reliable transport 245. In case the host is the master node, the update is handled locally.

The unicast channels are used (as shown by 208) for normal communication between the master and agent nodes. The master has a unicast channel to each agent node, and one multicast channel to all agent nodes. In some embodiments, the master uses a multicast address and all agents listen to the multicast address and receive updates. As described further below, unicast channels are also used for retransmission of dropped master cluster directory updates, which were issued to a multicast address. Multicast cluster directory updates are received (if the node is an agent node) through the multicast socket 280 and ordered by retransmit/reorder module 285 with respect to retransmitted directory updates (as shown by 209). In other words, the messages are sorted based on the sequence number of multicast messages. The sequence number of successive cluster directory update messages is sequentially increased by a constant value (e.g., the sequence number of each successive update message is increased by one). Ordered messages are delivered (as shown by 210) to the state-specific receive handler 275.

Unordered messages such as heartbeats, cluster discovery messages, etc., are delivered (as shown by 211) to the state-specific receive handler 275. The state-specific timer callback 270 generates multicast heartbeats that are sent (as shown by 212) out through the multicast socket 280. The state-specific receive handler 275 may update (as shown by 213) the local copy 250 of the cluster directory based on messages received from the master node. Updates to the cluster directory invoke (as shown by 214 and 215) subscriber callbacks.

A. Retransmission of Large Multicast Messages Through Unicast Channel

Updates to cluster directory that reflect changes to storage objects are received by the master node from the agent nodes that want to change the objects. The master node updates the master copy of the cluster directory and sends the updates to the agent nodes that are subscribed to receive updates to the changed storage nodes. The master node sends the cluster directory updates through a multicast channel. A multicast packet, however, has a size limit. When the packet size exceeds a threshold, the master node cannot send the update through multicast channel and has to retransmit the packet to subscribed agent node through a unicast channel.

Figure 3:
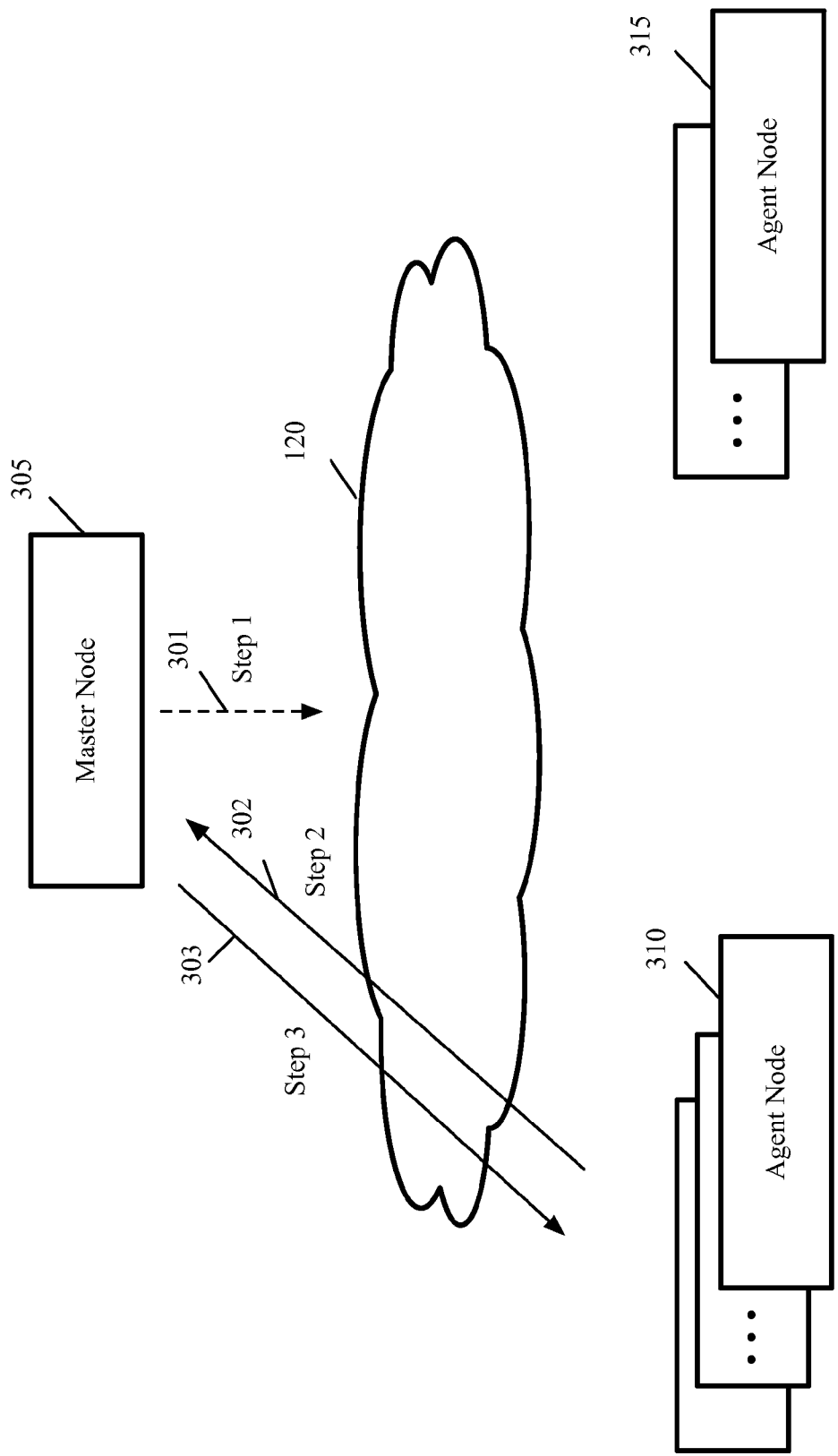
FIG. 3 illustrates a prior art method of retransmission of multicast messages through a unicast channel.

FIG. 3 illustrates a prior art method of retransmission of multicast messages through a unicast channel. The master node 305 in this example has already received an update to a storage object. In this example, a set of agent nodes 310 are subscribed to receive updates for this particular storage object. Other agent nodes 315 are not subscribed to receive updates to these storage objects. Although these agent nodes may receive the multicast update messages, the agent nodes 315 ignore the update messages that include updates for which the agent nodes are not subscribed. In FIG. 3 and other figures that follow, the multicast update messages sent to agent nodes that are not subscribed to receive the updates are not shown for simplicity.

As shown, the master node 305 in step 1 attempts (as shown by 301) to send cluster directory updates to the subscribed agent nodes 310. The master node determines that the update exceeds the maximum size threshold for multicast packets. The master node, therefore, does not send the packet through multicast channel in step 1.

In step 2, the agent nodes 310 issue (as shown by 302) a retransmission request for this message to the master node through unicast channel after a wait period. For instance, the agent node receives a heartbeat message from the master node, examines the sequence number of the next update message included in the heartbeat message, and determines that one or more update messages have not been received. For example, if the last update message had a sequence number of 20 and the heartbeat message specifies the sequence number of the next update message as 24, the agent node concludes that update messages with sequence numbers 21-23 have not been received at the agent node. Since the heartbeats are sent at fixed intervals (e.g., 1 seconds apart), there may be a large delay before an agent node finds out about a missing update message and sends a retransmission request.

In step 3, the master node responds to the retransmission request received from each agent node by retransmitting (as shown by 303) a separate update message to the agent node through the unicast channel. The timeout required for the subscribed agent nodes 310 to issue a retransmission request significantly slows down the update of local cluster directories.

Figure 4:
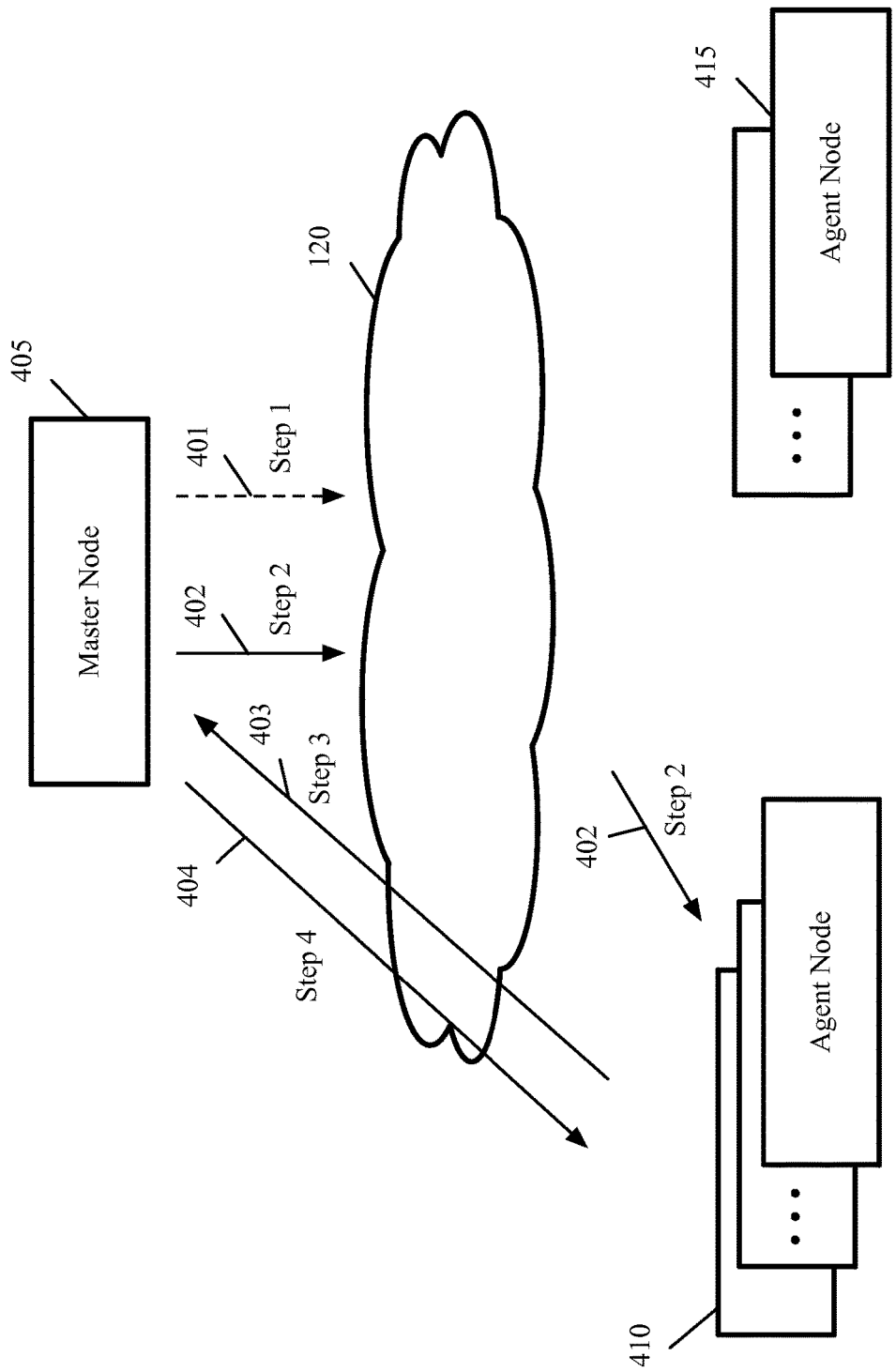
FIG. 4 conceptually illustrates a method of retransmission of large multicast packets through unicast channels in some embodiments of the invention.

FIG. 4 conceptually illustrates a method of retransmission of large multicast packets through unicast channels in some embodiments of the invention. In the example of FIG. 4 the master has already received an update a storage object. In this example, a set of agent nodes 410 are subscribed to receive updates for the storage object. Other agent nodes, such as agent nodes 415 are not subscribed to receive updates to these storage objects.

As shown, the master node 405 in step 1 attempts (as shown by 401) to send cluster directory updates to the subscribed agent nodes 410. The master node determines that the update exceeds the maximum size threshold for multicast packets. The master node, therefore, does not send the packet in step 1.

The master node in step 2, instead of multicasting the original update message, multicasts a retransmission trigger message to the subscribed agent nodes 410 (as shown by 402). The subscribed nodes 410 in this example successfully receive the message. In step 3, the subscribed agent nodes 410 issue (as shown by 403) retransmission requests to the master node using the unicast channel in response to receiving the retransmission trigger message. The agent nodes send the retransmission requests immediately and without any timeouts. In step 4, the master node 405 retransmits (as shown by 404) the update message to each agent node by sending a separate unicast packet to each agent node 410 via a unicast channel between the master node and the agent node. In some embodiments, the protocol used to communicate between the master and agents does not allow the master node to initiate an unsolicited unicast message to an agent node. The retransmission trigger message delivered to the agent nodes through the multicast channel triggers the agent nodes to immediately send the retransmission request through the unicast channel and therefore allowing the master to immediately send the updates to each agent node through each unicast channel between the master and each agent node. Without the retransmission trigger message, the agent nodes had to wait either for the next update message or the next heartbeat message (as described above) to determine that a multicast message has not been received from the master node.

Figure 5:
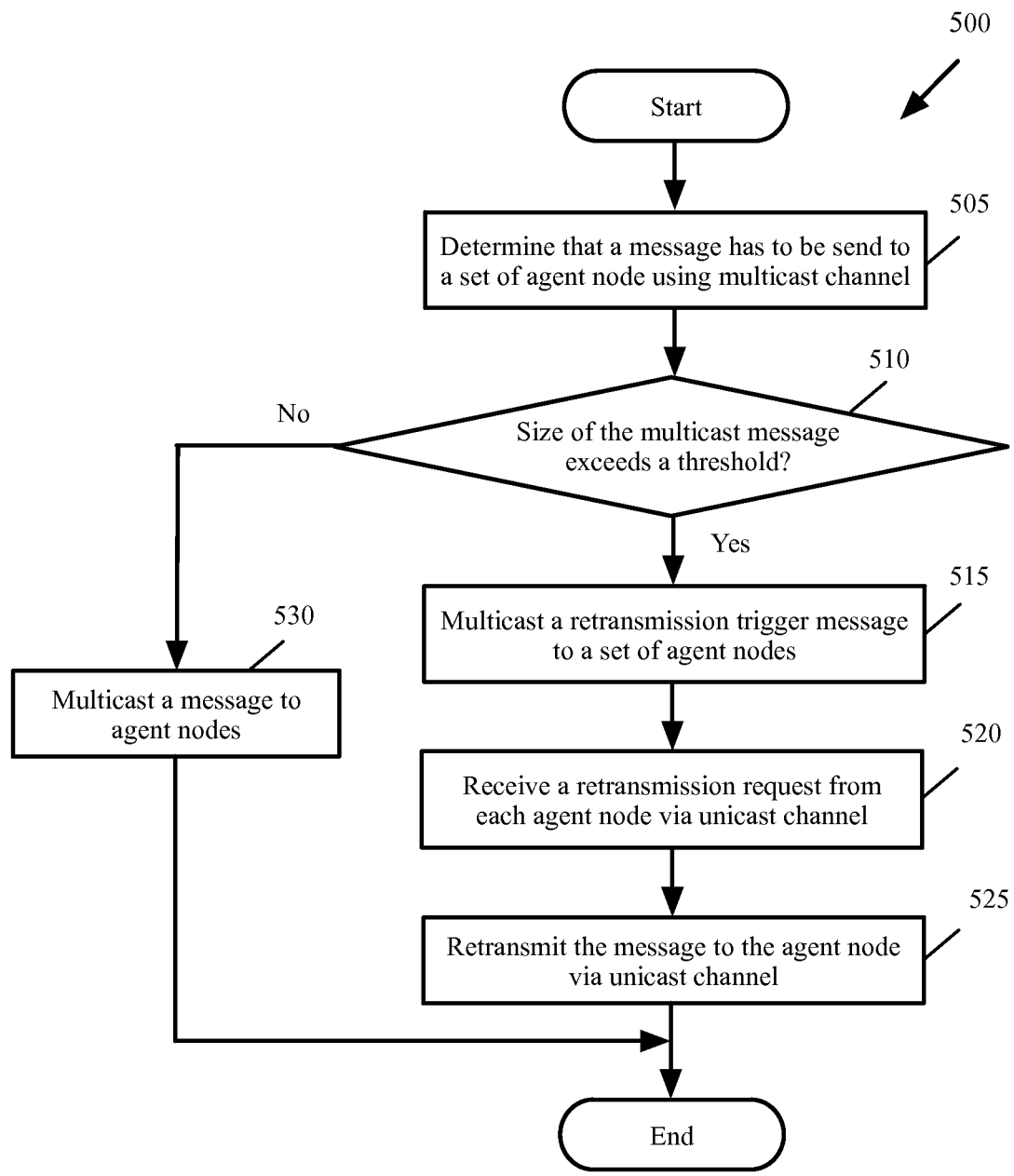
FIG. 5 conceptually illustrates a process for retransmitting multicast messages through unicast channels in a cloud distributed storage system in some embodiments of the invention.

FIG. 5 conceptually illustrates a process 500 for retransmitting multicast messages through unicast channels in a cloud distributed storage system in some embodiments of the invention. As shown, the process determines (at 505) that a multicast message has to be sent to a set of agent nodes through a multicast channel. For instance, a VM hosted in an agent node changes an object and sends (e.g., as shown by 206 and 202 in FIG. 2) an update to the cluster directory to the master node. The master node receives the update to cluster directory from the agent node and has to multicast the update to other agent nodes.

The process then determines (at 510) whether the size of the multicast message exceeds a predetermined or configurable threshold. If not, the process sends (at 530) the update message to a set of agent nodes using a multicast message. Otherwise, instead of sending the update message, the process multicasts (at 515) a retransmission trigger message to the agent nodes. The retransmission trigger message identifies the sequence number of the multicast message (e.g., the sequence number of the directory update message that exceeds the multicast message size limit).

The process then receives (at 520) a retransmission request from each of the agent nodes through the unicast channel. The retransmission request uses the sequence number received in the retransmission trigger message. The process then retransmits (at 525) the message (e.g., the cluster directory update message) in response to receiving of the retransmission request message from each agent node using a unicast channel between the master node and the agent node. The process then ends.

Figure 6:
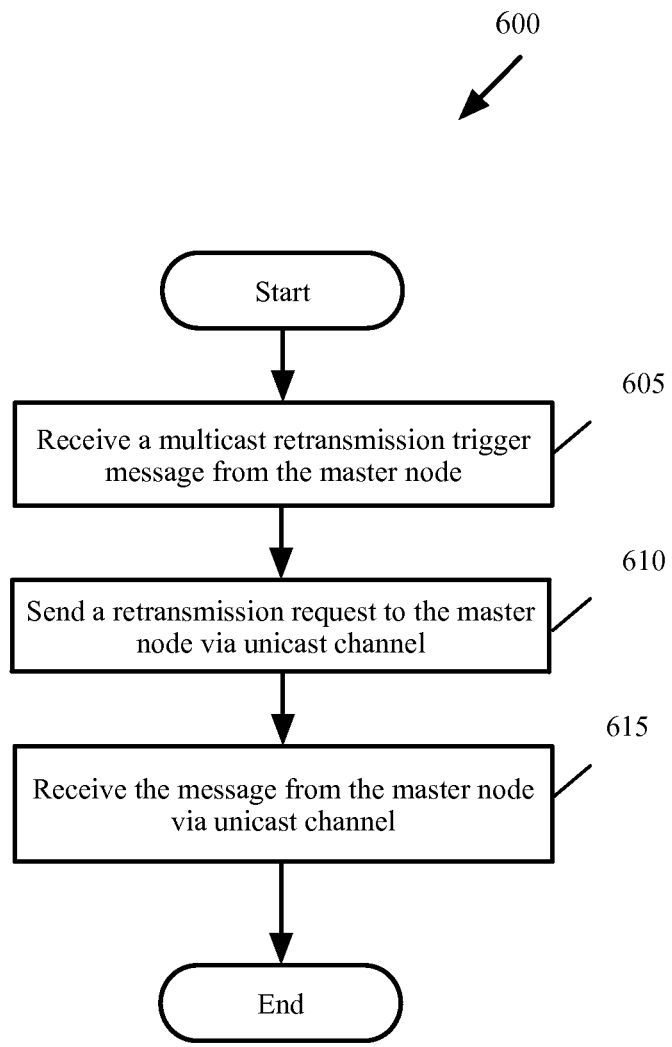
FIG. 6 conceptually illustrates a process for requesting retransmission of a cluster directory update message by an agent node in some embodiments of the invention.

FIG. 6 conceptually illustrates a process 600 for requesting retransmission of a cluster directory update message by an agent node in some embodiments of the invention. As shown, the process receives (at 605) a multicast retransmission trigger message from the master node. The retransmission trigger message includes the sequence number of the update message to be retransmitted.

The process then sends (at 610) a retransmission request from the agent node to the master node via unicast channel. The retransmission request includes the sequence number of the message to be retransmitted. The process then receives (at 615) the cluster directory update message via the unicast channel. The process then ends.

B. Retransmission of Missed Multicast Messages through Unicast Channel

Figure 7:
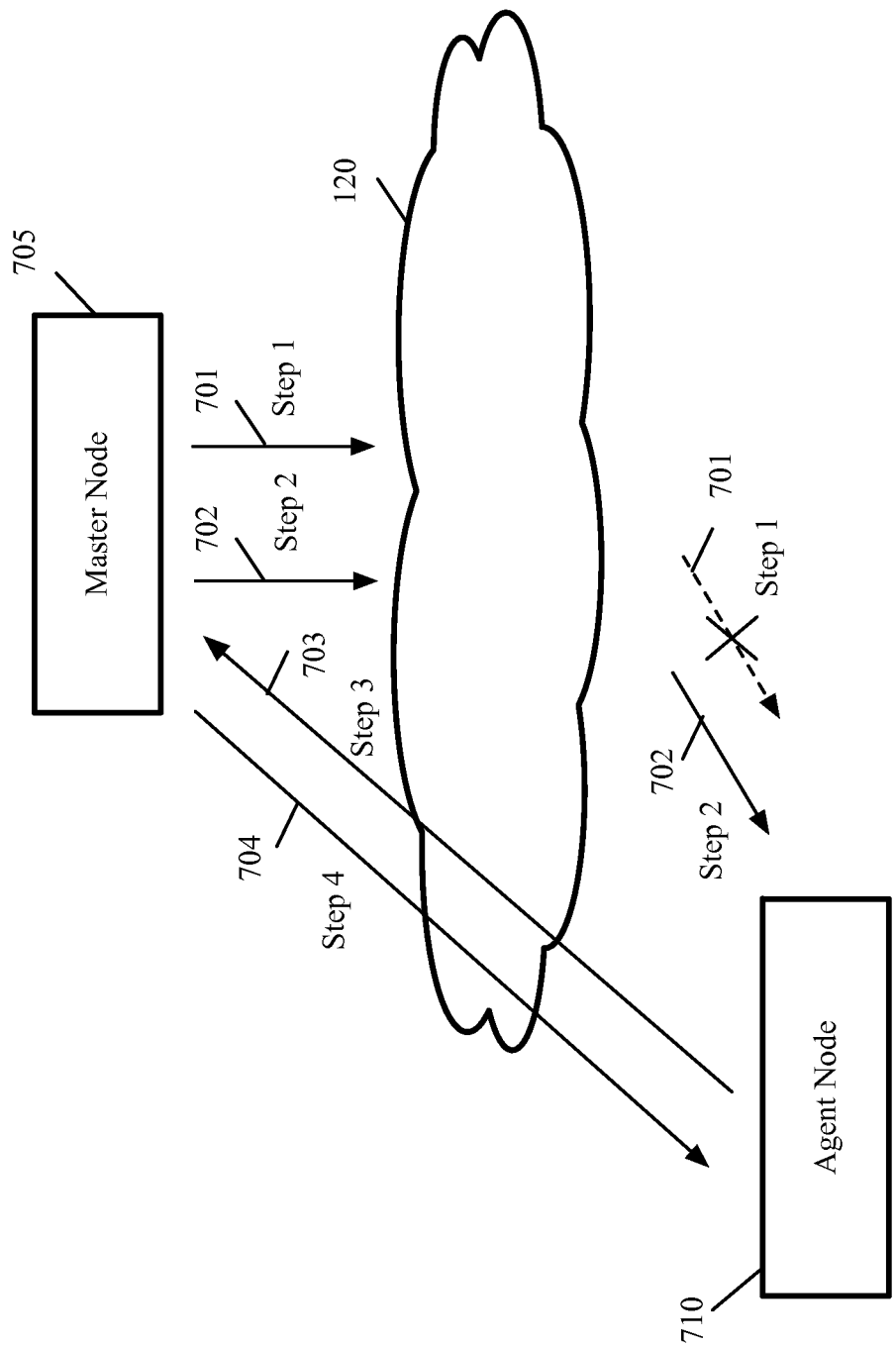
FIG. 7 conceptually illustrates retransmission of a multicast message that is transmitted by the master node but not received by an agent node in some embodiments of the invention.

FIG. 7 conceptually illustrates retransmission of a multicast message that is transmitted by the master node but not received by an agent node in some embodiments of the invention. The update messages sent by the master node using multicast packets include a sequence number. Each recipient agent node receives messages to update the local cluster directory in sequence. For instance, the message with sequence number N+1 is receive after a message with sequence number N. When an agent node receives a multicast update message, the agent node compares the sequence number of the multicast message against the sequence number of the last update message received (through multicast or through unicast retransmission as described above) from the master node. If the agent node determines that one or more updates have not received at the agent node, the agent node sends a retransmission request for each skipped message.

As shown, the master node 705 sends (as shown by 701) a multicast message (with a size that is less than the maximum threshold) to an agent node. The message, however, is not received at the agent node, e.g., due to a transmission error.

In step 2, the master sends (as shown by 702) a subsequent update message or a multicast heartbeat message to the same agent node 710 at a later time. The subsequent message is successfully received at the agent node. The agent node compares the sequence of the received message (if the received multicast message is an update message that has a sequence number or the message is a heartbeat message that includes the sequence number of the next multicast message) with the sequence number of the last update message received from the master node and determines that the update message sent by the master node in step 1 is not received at the agent node.

The agent node sends (as shown by 703) a retransmission request that identifies the sequence number of the message in step 1 as the missing message. In step 4, the master sends (as shown by 704) a retransmission of the message of step 1 as a unicast message to the agent node 710.

Figure 8:
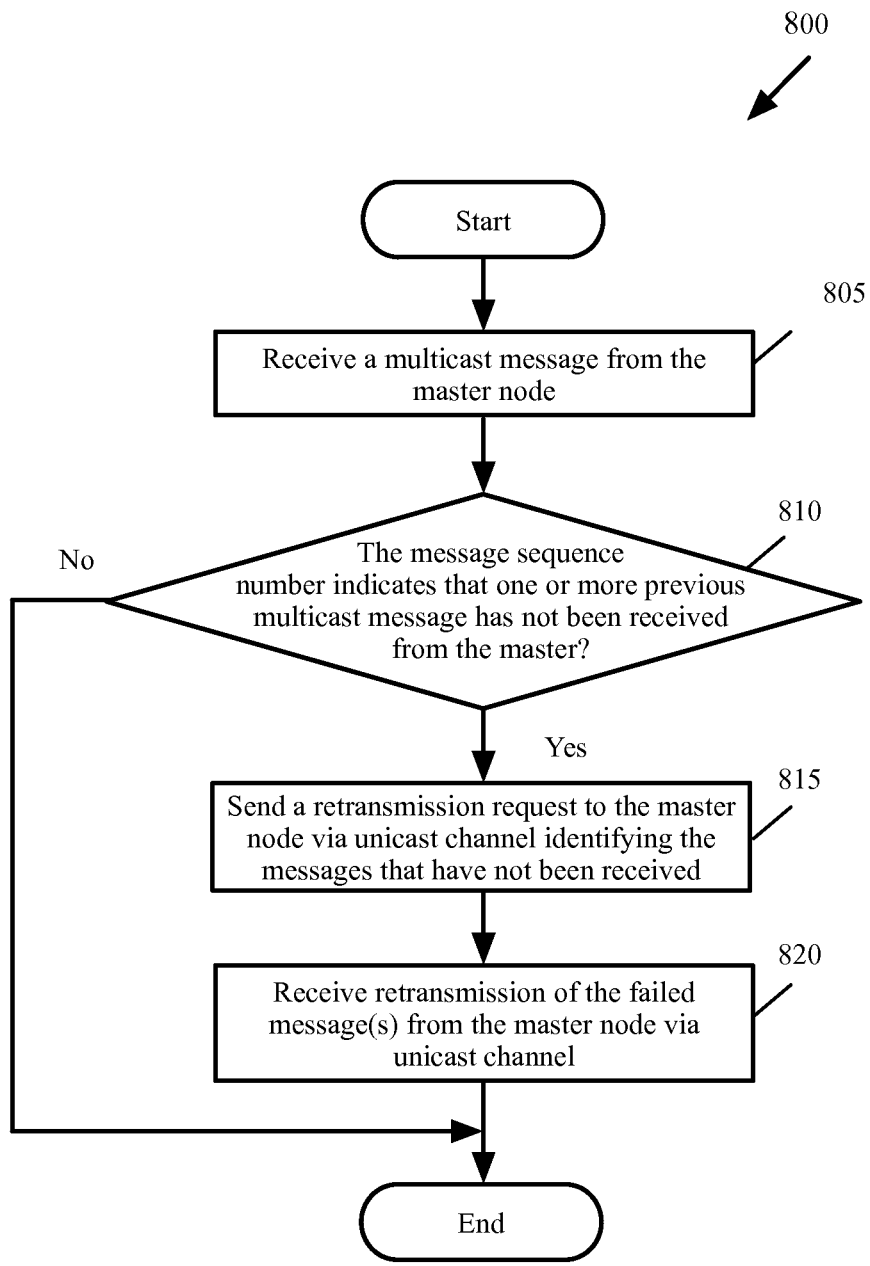
FIG. 8 conceptually illustrates a process for receiving retransmission of missed multicast messages through unicast channel in some embodiments of the invention.

FIG. 8 conceptually illustrates a process 800 for receiving retransmission of missed multicast messages through unicast channel in some embodiments of the invention. As shown, the process receives (at 805) a multicast message from the master node. The process determines (at 810) whether a message sequence number included in the message (if the message is an update message, the message has a sequence number; if the message is a heartbeat message, the message includes the sequence number of the next multicast message) indicates that one or more previous multicast cluster directory update messages have not been received from the master node.

When the process determines that no update messages are missed, the process exits. Otherwise, the process sends (at 815) one or more retransmission requests to the master node via unicast channel, each message identifying the sequence number of a multicast message that has not been received. The process then receives (at 820) retransmission of the failed message or messages from the master node through the unicast channel. The process then ends.

IV. Electronic System

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 9:
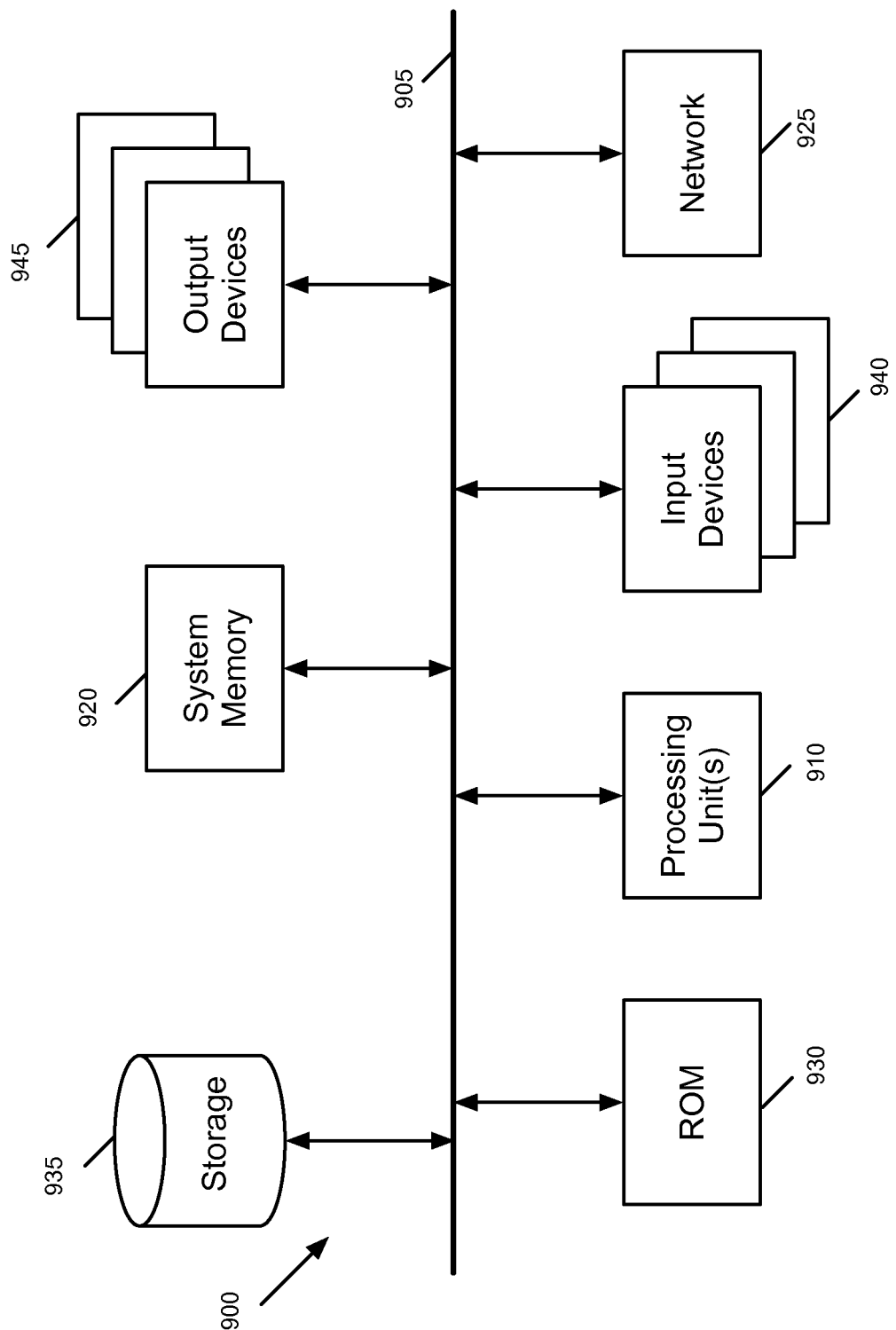
FIG. 9 conceptually illustrates an electronic system with which some embodiments of the invention are implemented.

FIG. 9 conceptually illustrates an electronic system 900 with which some embodiments of the invention are implemented. The electronic system 900 can be used to execute any of the control, virtualization, or operating system applications described above. The electronic system 900 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 900 includes a bus 905, processing unit(s) 910, a system memory 920, a read-only memory (ROM) 930, a permanent storage device 935, input devices 940, and output devices 945.

The bus 905 collectively represents all system, peripheral, and chipset buses that communicatively connect the numerous internal devices of the electronic system 900. For instance, the bus 905 communicatively connects the processing unit(s) 910 with the read-only memory 930, the system memory 920, and the permanent storage device 935.

From these various memory units, the processing unit(s) 910 retrieve instructions to execute and data to process in order to execute the processes of the invention. The processing unit(s) may be a single processor or a multi-core processor in different embodiments.

The read-only-memory 930 stores static data and instructions that are needed by the processing unit(s) 910 and other modules of the electronic system. The permanent storage device 935, on the other hand, is a read-and-write memory device. This device is a non-volatile memory unit that stores instructions and data even when the electronic system 900 is off. Some embodiments of the invention use a mass-storage device (such as a magnetic or optical disk and its corresponding disk drive) as the permanent storage device 935.

Other embodiments use a removable storage device (such as a floppy disk, flash drive, etc.) as the permanent storage device. Like the permanent storage device 935, the system memory 920 is a read-and-write memory device. However, unlike storage device 935, the system memory is a volatile read-and-write memory, such a random access memory. The system memory stores some of the instructions and data that the processor needs at runtime. In some embodiments, the invention's processes are stored in the system memory 920, the permanent storage device 935, and/or the read-only memory 930. From these various memory units, the processing unit(s) 910 retrieve instructions to execute and data to process in order to execute the processes of some embodiments.

The bus 905 also connects to the input and output devices 940 and 945. The input devices enable the user to communicate information and select commands to the electronic system. The input devices 940 include alphanumeric keyboards and pointing devices (also called "cursor control devices"). The output devices 945 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 9, bus 905 also couples electronic system 900 to a network 925 through a network adapter (not shown). In this manner, the computer can be a part of a network of computers (such as a local area network ("LAN"), a wide area network ("WAN"), or an Intranet, or a network of networks, such as the Internet. Any or all components of electronic system 900 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral or transitory signals.

While the invention has been described with reference to numerous specific details, one of ordinary skill in the art will recognize that the invention can be embodied in other specific forms without departing from the spirit of the invention. In addition, a number of the figures (including FIGS. 5-6 and 8) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process.

This specification describes several methods and systems for retransmission of multicast messages through unicast channels. Several examples are provided throughout the specification that use directory update messages as an example of such multicast messages. One or ordinary skill in the art will recognize that the disclosed methods and systems are readily applicable to retransmission of other multicast messages through unicast channels without deviating from the teachings of the invention.

This specification refers throughout to computational and network environments that include virtual machines (VMs). However, virtual machines are merely one example of data compute nodes (DNCs) or data compute end nodes, also referred to as addressable nodes. DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system uses name spaces to isolate the containers from each other and therefore provides operating-system level segregation of the different groups of applications that operate within different containers. This segregation is akin to the VM segregation that is offered in hypervisor-virtualized environments that virtualize system hardware, and thus can be viewed as a form of virtualization that isolates different groups of applications that operate in different containers. Such containers are more lightweight than VMs.

Hypervisor kernel network interface modules, in some embodiments, is a non-VM DCN that includes a network stack with a hypervisor kernel network interface and receive/transmit threads. One example of a hypervisor kernel network interface module is the vmknic module that is part of the ESXi™ hypervisor of VMware, Inc.

One of ordinary skill in the art will recognize that while the specification refers to VMs, the examples given could be any type of DCNs, including physical hosts, VMs, non-VM containers, and hypervisor kernel network interface modules. In fact, the example networks could include combinations of different types of DCNs in some embodiments.

In view of the foregoing, one of ordinary skill in the art would understand that the invention is not to be limited by the foregoing illustrative details, but rather is to be defined by the appended claims.

What is claimed is:

1. A method of retransmitting a multicast message through a unicast channel in a virtual distributed storage system comprising a cluster of nodes comprising a master node and a set of agent nodes, each node in the cluster of nodes maintaining a copy of a directory of the virtual distributed storage system, the master node multicasting messages to the agent nodes through a multicast channel to update the directory, the method comprising:
   at the master node, determining that a particular message to update the directory exceeds a maximum size limit for transmission to the agent nodes through the multicast channel, the particular message comprising an identification of the message;
   multicasting a retransmission trigger message from the master node to each of the agent nodes, the retransmission trigger message comprising the identification of the particular message, wherein the master and the agent nodes utilize a protocol to communicate the multicast and unicast messages, wherein said protocol does not allow the master node to send an unsolicited unicast message to an agent node;
   in response to the retransmission trigger message, receiving a retransmission request message at the master node from each of the agent nodes through a unicast channel established between the master node and the agent node; and
   in response to the receiving of the retransmission request message from each agent node, sending the particular message to update the directory from the master node to the agent node through the unicast channel established between the master node and the agent node.

2. The method of claim 1, wherein the identification of the particular message is a sequence number of the message, wherein each directory update message transmitted from the master node comprises a sequence number that increases for each consecutive directory update message.

3. The method of claim 1 further comprising:
   receiving an update to the directory of the distributed storage system at the master node from an agent node; and
   updating the copy of directory of the distributed storage system maintained by the master node based on the received update,
   wherein the directory update message is sent from the master node to each agent node to update the copy of the directory of the distributed storage system maintained by each agent node based on the received update.

4. The method of claim 1, wherein each node is a physical computing device executing a plurality of data compute nodes (DCNs), wherein the update to the directory of the distributed storage system is received at the master node from an agent node when a DCN on the agent node updates an object in the distributed storage system.

5. The method of claim 4, wherein a DCN is a virtual machine (VM).

6. The method of claim 1, wherein the protocol is an open systems interconnection (OSI) model layer 2 (L2) protocol.

7. The method of claim 1, wherein each node is a physical computing device comprising a set of local storage resources, wherein the virtual distributed storage system comprises the local storage resources of each node in the cluster of nodes.

8. The method of claim 1, wherein the virtual distributed storage system comprises a set of storage objects, each storage object in the set of storage objects maintained by a node in the cluster of nodes.

9. A non-transitory machine readable medium storing a program for retransmitting a multicast message through a unicast channel in a virtual distributed storage system comprising a cluster of nodes comprising a master node and a set of agent nodes, each node in the cluster of nodes maintaining a copy of a directory of the virtual distributed storage system, the master node multicasting messages to the agent nodes through a multicast channel to update the directory, the program executable by a set of processing units of the master node, the program comprising sets of instructions for:
   determining that a particular message to update the directory exceeds a maximum size limit for transmission to the agent nodes through the multicast channel, the particular message comprising an identification of the message;
   multicasting a retransmission trigger message from the master node to each of the agent nodes, the retransmission trigger message comprising the identification of the particular message, wherein the master and the agent nodes utilize a protocol to communicate the multicast and unicast messages, wherein said protocol does not allow the master node to send an unsolicited unicast message to an agent node;

receiving, in response to the retransmission trigger message, a retransmission request message at the master node from each of the agent nodes through a unicast channel established between the master node and the agent node; and sending, in response to the receiving of the retransmission request message from each agent node, the particular message to update the directory from the master node to the agent node through the unicast channel established between the master node and the agent node.

10. The non-transitory machine readable medium of claim 9, wherein the identification of the particular message is a sequence number of the message, wherein each directory update message transmitted from the master node comprises a sequence number that increases for each consecutive directory update message.

11. The non-transitory machine readable medium of claim 9, the program further comprising sets of instructions for:

receiving an update to the directory of the distributed storage system at the master node from an agent node; and updating the copy of directory of the distributed storage system maintained by the master node based on the received update, wherein the directory update message is sent from the master node to each agent node to update the copy of the directory of the distributed storage system maintained by each agent node based on the received update.

12. The non-transitory machine readable medium of claim 9, wherein each node is a physical computing device executing a plurality of data compute nodes (DCNs), wherein the update to the directory of the distributed storage system is received at the master node from an agent node when a DCN on the agent node updates an object in the distributed storage system.

13. The non-transitory machine readable medium of claim 12, wherein a DCN is a virtual machine (VM).

14. The non-transitory machine readable medium of claim 9, wherein the protocol is an open systems interconnection (OSI) model layer 2 (L2) protocol.

15. The non-transitory machine readable medium of claim 9, wherein each node is a physical computing device comprising a set of local storage resources, wherein the virtual distributed storage system comprises the local storage resources of each node in the cluster of nodes.

16. The non-transitory machine readable medium of claim 9, wherein the virtual distributed storage system comprises a set of storage objects, each storage object in the set of storage objects maintained by a node in the cluster of nodes.

* * * * *